Patented Aug. 9, 1938

2,125,941

UNITED STATES PATENT OFFICE 2,125,941

MANUFACTURE OF NITRIC ACID ESTERS AND OF EXPLOSIVES

Oskar Matter, Vitznau, Switzerland, assignor to Société d'Exploitation des Brevets O. Matter—S. E. B. O. M., Bourges, France No Drawing. Application November 15, 1935, Serial No. 50,062. In France November 16, 1934

11 Claims. (Cl. 52—5)

It is known that nitric acid esters $R(ONO_2)_n$ are easily decomposable, and that they sometimes give rise to explosions, particularly when maintained at a low temperature or when acid or alkaline reacting materials are left in them. In order to prevent such decomposition and to be able to preserve them it is necessary to add materials which give inert stable bodies—with the occasional decomposition products. For such reason the said materials are called "stabilizers".

I have now ascertained that tertiary aromatic amines and particularly triphenylamine $(C_6H_5)_3N$ and its derivatives may easily form composite compounds which are stable, with nitric acid $NO_3H$, nitrous acid $NO_2H$ or nitrous gases.

The present invention has for its object first of all the use of such tertiary aromatic amines and particularly triphenylamine and its derivatives as a stabilizing agent of nitric acid esters.

Such tertiary aromatic amines have as stabilizing agents the following advantages (instead of the stabilizing agents hitherto used, such as diphenylamine $(C_6H_5)_2NH$), their reaction is neither acid nor basic (i. e. they are neutral), this being a very important feature for their use in mixture with nitric acid esters; further they are insoluble in water, not volatile, not hygroscopic, odourless and their melting points are always very high.

When the tertiary aromatic amine is added to smokeless powder in a convenient manner, for instance at the surface of the elements, it will act as retarding agent, i. e. thus reduce the rate of combustion of the powder. This feature is without doubt due to the fact that the tertiary aromatic amines are not easy to ignite, even at a high temperature.

The present invention also consists in the use of tertiary aromatic amines as a retarding agent for smokeless powders. As indicated above, the said amines can be used as such or in the form of their derivatives, the latter being within the scope of the invention, and within the scope of the appended claims.

The addition of tertiary aromatic amines to nitric acid esters is generally easy. The operation will advantageously be as follows:

(1) In the case of nitroglycerine $C_3H_5(ONO_2)_3$ and of dinitroglycol $C_2H_4(ONO_2)_2$ the addition of the tertiary aromatic amine will be sufficient since it will be directly dissolved therein and in sufficient quantity.

(2) In the case of tetranitrated pentaerythrite $C(CH_2ONO_2)_4$ and of hexanitrated mannite $C_6H_8(ONO_2)_6$, the nitric acid ester and the tertiary aromatic amine are poured into a water miscible solvent such as acetone $CH_3COCH_3$; a solution is thus obtained from which the desired mixture is precipitated by pouring it in a considerable excess of water under strong agitation.

(3) In the case of nitrocellulose powders, the amine may be dissolved into plastifying materials, (ether, alcohol, and the like for ordinary powders or nitroglycerine for ballistic powders) before their addition to the powder; the mixture thus obtained is then passed through breakers or rolling mills. The amine may also be dissolved in a solvent and added in this way to the powder in the course of its manufacture before its passage through the breakers or the rolling mills.

(4) In the case in which the powder is granular or lamellar the external surface of the elements forming the powder may be coated with a layer of tertiary aromatic amine as is the actual practice for coating such elements with graphite. Such process is particularly advantageous when the amine is used as a retarding agent.

I claim:

1. A new industrial product which is a mixture containing a nitric acid ester, which ester is stabilized by the presence of a tertiary aromatic amine which is characterized by being substantially neutral in reaction, substantially non-volatile at normal atmospheric temperature and pressure, and having a high melting point, and being substantially non-hygroscopic.

2. A new industrial product which is a mixture containing a nitric acid ester and triphenyl amine.

3. A smokeless explosive containig a solid nitric acid ester of a carbohydrate, and a tertiary aromatic amine, such amine being non-acid, non-basic, non-volatile, non-hygroscopic and having a high melting point, and capable of forming stable compounds with nitric acid, nitrous acid and nitrous gases.

4. A smokeless powder containing a solid nitric acid ester of a carbohydrate and a liquid nitric acid ester of a polyhydric alcohol, and a tertiary aromatic amine, such amine being non-acid, non-basic, non-volatile, non-hygroscopic and having a high melting point, and capable of forming stable compounds with nitric acid, nitrous acid and nitrous gases.

5. An explosive containing a liquid nitric acid ester of a polyhydric alcohol having a tertiary aromatic amine dissolved therein, said amine being non-acid, non-basic, non-hygroscopic, stable, and capable of forming a stable solution in said ester, and capable of forming stable compounds with nitric acid, nitrous acid and nitrous gases.

6. A solution of triphenylamine in a liquid nitric acid ester of a polyhydric alcohol.

7. Nitrocellulose powder stabilized with a tertiary aromatic amine.

8. A nitrocarbohydrate explosive containing a triarylamine.

9. A mixture which comprises a solid nitric acid ester mixed with a solution of a tertiary aromatic amine in a liquid nitric acid ester.

10. Smokeless powder containing a solid nitric acid ester and a liquid nitric acid ester and a tertiary aromatic amine which latter is non-volatile, non-hygroscopic and has a high boiling point.

11. Smokeless powder comprising a solid nitric acid ester and a liquid nitric acid ester, the latter having triphenylamine dissolved therein.

OSKAR MATTER.